US008755918B2

(12) United States Patent
Osawa et al.

(10) Patent No.: US 8,755,918 B2

(45) Date of Patent: Jun. 17, 2014

(54) ILLUMINATION DEVICE

(75) Inventors: Hideharu Osawa, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 133 days.

(21) Appl. No.: 13/128,921

(22) PCT Filed: Nov. 25, 2009

(86) PCT No.: PCT/JP2009/069817

§ 371 (c)(1), (2), (4) Date: May 12, 2011

(87) PCT Pub. No.: WO2010/061827

PCT Pub. Date: Jun. 3, 2010

(65) Prior Publication Data

US 2011/0230984 A1 Sep. 22, 2011

(30) Foreign Application Priority Data

Nov. 25, 2008 (JP) ................................ 2008-299558

(51) Int. Cl.
*G06F 17/00* (2006.01)

(52) U.S. Cl.
USPC ............. 700/90; 700/275; 700/295; 700/297; 315/34; 315/149; 315/291; 315/307; 315/308; 340/815.45

(58) Field of Classification Search
USPC ........................... 315/34, 149, 291, 307, 308; 340/815.45; 700/90, 275, 295, 296, 700/297
See application file for complete search history.

(56) References Cited

U.S. PATENT DOCUMENTS

| | | | | |
|---|---|---|---|---|
| 2002/0065583 | A1 * | 5/2002 | Okada et al. | 700/295 |
| 2008/0074872 | A1 * | 3/2008 | Panotopoulos | 362/231 |
| 2010/0106306 | A1 * | 4/2010 | Simon et al. | 700/276 |
| 2010/0327766 | A1 * | 12/2010 | Recker et al. | 315/291 |

FOREIGN PATENT DOCUMENTS

| | | | |
|---|---|---|---|
| JP | 2000-126124 | | 5/2000 |
| JP | 2002-260877 | | 9/2002 |
| JP | 2002260877 | A * | 9/2002 |
| JP | 2004-335426 | | 11/2004 |
| JP | 2005-100854 | | 4/2005 |
| JP | 2006-85344 | | 3/2006 |
| JP | 2006085344 | A * | 3/2006 |
| JP | 2006-236669 | | 9/2006 |
| JP | 2007-94538 | | 4/2007 |
| JP | 2007-109421 | | 4/2007 |
| JP | 2008-91160 | | 4/2007 |
| JP | 2007-115594 | | 5/2007 |
| JP | 3145179 | U | 10/2008 |

* cited by examiner

*Primary Examiner* — Douglas W Owens
*Assistant Examiner* — Thai Pham
(74) *Attorney, Agent, or Firm* — Fish & Richardson P.C.

(57) ABSTRACT

The exchange time information to be acquired from an LED illumination lamp by an illumination instrument or the exchange time information to be stored by the illumination instrument itself is recognized by a controller via an ON/OFF control-dedicated switch control line or a general-purpose power line. The exchange time information is acquired in an OFF period of the LED illumination lamp ON-period noise. The exchange time information acquisition function is checked on a daily basis so as to cope with an alarm after a long period. The exchange time check result is stored so as to execute the alarm at an appropriate timing. The exchange time information held by the LED illumination lamp itself is transmitted firstly to the illumination instrument by simple information transmission means. The information is recognized by using a control path existing between the illumination instrument and the controller at hand.

17 Claims, 9 Drawing Sheets

ILLUMINATION DEVICE

TECHNICAL FIELD

The present invention relates to an illumination device and an illumination lamp that is used for the illumination device.

BACKGROUND ART

Conventionally, various illumination devices are proposed for various purposes. The most classical light source used for an illumination device is an incandescent lamp, and later fluorescent lamps have become widespread. Further, mercury lamps have also been used for some purposes. In recent years, LEDs have been used widely, and it is proposed to constitute white color LEDs compatible with a fluorescent lamp so as to use them for general ceiling illumination (Patent Document 1). On the other hand, various proposals are made for controlling illumination devices. For example, there is proposed a method of communicating between each of IC tag seals affixed respectively to many fluorescent lamps and a single IC tag reader/writer that covers the whole area inside a building with electromagnetic communication, so as to generate an alarm automatically for exchanging any of the fluorescent lamps when a predetermined life time has passed from start of use thereof (Patent Document 2). In addition, there is also provided a method of using power line carrier communication for dimmer control of many fluorescent lamps each of which has a dimmer inverter by a single dimmer controller (Patent Document 3).

PRIOR ART DOCUMENTS

Patent Documents

Patent Document 1: JP-A-2004-335426
Patent Document 2: JP-A-2006-85344
Patent Document 3: JP-A-2007-109421

DISCLOSURE OF THE INVENTION

Problem to be Solved by the Invention

However, in order to provide an illumination device that is suitable for various use conditions, there are many problems to be studied further.

In view of the above discussion, an object of the present invention is to provide an illumination device that can be used in a manner suitable for the condition.

Means for Solving the Problem

In order to achieve the above-mentioned object, an illumination device disclosed in this specification has a structure including an illumination instrument whose light source is an LED illumination lamp, and a remote controller which remote controls turn-on of the LED illumination lamp and remote receives information about exchange time of the LED illumination lamp from the illumination instrument (First structure).

Note that the illumination device having the first structure preferably includes a storage unit in the illumination instrument, which stores the information about exchange time of the LED illumination lamp (Second structure).

In addition, in the illumination device having the second structure, the LED illumination lamp is preferably detachable from the illumination instrument, and the storage unit stores the information about exchange time when the LED illumination lamp is attached (Third structure).

In addition, in the illumination device having the first structure, the LED illumination lamp is preferably detachable from the illumination instrument, and the illumination instrument includes an acquiring unit which acquires the information about exchange time stored in the LED illumination lamp from the LED illumination lamp (Fourth structure).

In addition, in the illumination device having the first structure, control route from the remote controller to the illumination instrument is preferably the same as transmission route of the information about exchange time of the LED illumination lamp from the illumination instrument to the remote controller (Fifth structure).

In addition, in the illumination device having the fifth structure, the control route and the transmission route are preferably a power line (Sixth structure).

In addition, in the illumination device having the fifth structure, the control route is preferably a switch control signal transmission route for controlling on and off of the LED illumination lamp, and the switch control signal transmission route is also used as the transmission route for the information about exchange time of the LED illumination lamp (Seventh structure).

In addition, in the illumination device having the first structure, the LED illumination lamp is preferably detachable from the illumination instrument, and the illumination instrument includes a storage unit which stores the information about exchange time of the LED illumination lamp, a control unit which controls the storage unit to store the information about exchange time when the LED illumination lamp is attached, and a transmitting unit which transmits externally the information about exchange time of the LED illumination lamp stored in the storage unit (Eighth structure).

In addition, in the illumination device having the first structure, the LED illumination lamp is preferably detachable from the illumination instrument, and the illumination instrument includes an acquiring unit which acquires the information about exchange time stored in the LED illumination lamp from the LED illumination lamp, and a transmitting unit which transmits externally the information about exchange time of the LED illumination lamp acquired by the acquiring unit (Ninth structure).

In addition, in the illumination device having the first structure, the remote controller preferably includes a display unit which performs a display based on the information about exchange time of the LED illumination lamp that is received (Tenth structure).

In addition, in the illumination device having the tenth structure, the display unit preferably performs a display based on the information about exchange time of the LED illumination lamp in association with remote control of turn-on of the LED illumination lamp (Eleventh structure).

In addition, in the illumination device having the first structure, the remote controller preferably receives the information about exchange time of the LED illumination lamp from the illumination instrument during OFF period of the LED illumination lamp (Twelfth structure).

In addition, in the illumination device having the twelfth structure, the remote controller preferably controls the LED illumination lamp to be OFF state before the receiving unit receives the information about exchange time of the LED illumination lamp (Thirteenth structure).

In addition, in the illumination device having the twelfth structure, the remote controller preferably controls the LED illumination lamp to be ON state after the receiving unit receives the information about exchange time of the LED illumination lamp (Fourteenth structure).

In addition, an illumination device disclosed in this specification has a structure including an illumination instrument whose light source is an LED illumination lamp, and a controller including a receiving unit which receives information about exchange time of the LED illumination lamp from the illumination instrument and a checking unit which automatically checks a function of the receiving unit (Fifteenth structure).

Note that in the illumination device having the fifteenth structure, the controller preferably includes a control unit which remote controls turn-on of the LED illumination lamp, and automatically receives the information about exchange time of the LED illumination lamp from the illumination instrument in association with turn-on control of the LED illumination lamp by the control unit (Sixteenth structure).

In addition, in the illumination device having the sixteenth structure, the controller preferably includes a display unit which displays a result of the automatic checking of the function of the receiving unit (Seventeenth structure).

In addition, an illumination device disclosed in this specification has a structure including an illumination instrument whose light source is an LED illumination lamp, and a controller including a receiving unit which receives information about exchange time of the LED illumination lamp from the illumination instrument during OFF period of the LED illumination lamp (Eighteenth structure).

Note that in the illumination device having the eighteenth structure, the controller preferably includes a control unit which controls the LED illumination lamp to be OFF state before the receiving unit receives the information about exchange time of the LED illumination lamp (Nineteenth structure).

In addition, in the illumination device having the eighteenth structure, the controller preferably includes a control unit which controls the LED illumination lamp to be ON state after the receiving unit receives the information about exchange time of the LED illumination lamp (Twentieth structure).

Effects of the Invention

According to the present invention, it is possible to provide an illumination device that is suitable for various use conditions.

BEST MODE FOR CARRYING OUT THE INVENTION

Figure 1:
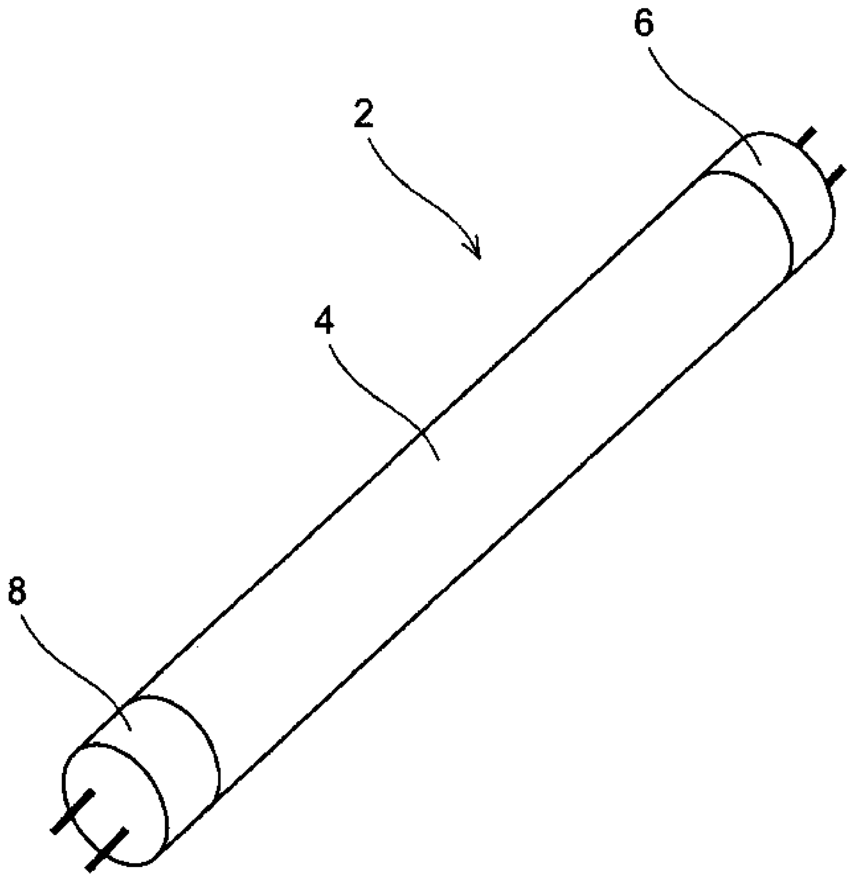
FIG. 1 is a perspective view of a linear fluorescent lamp type LED illumination lamp tube according to an embodiment of the present invention.

FIG. 1 is a perspective view of a linear fluorescent lamp type LED illumination lamp tube according to an embodiment of the present invention. An LED illumination lamp tube 2 of the present invention has the same appearance as an ordinary linear fluorescent lamp tube, which includes a linear tube portion 4 made of polycarbonate by extrusion molding process and bases 6 and 8 at both ends thereof. Having this structure, the LED illumination lamp tube of the present invention can be attached to an illumination instrument of an ordinary linear fluorescent lamp tube to substitute for the same.

Figure 2:
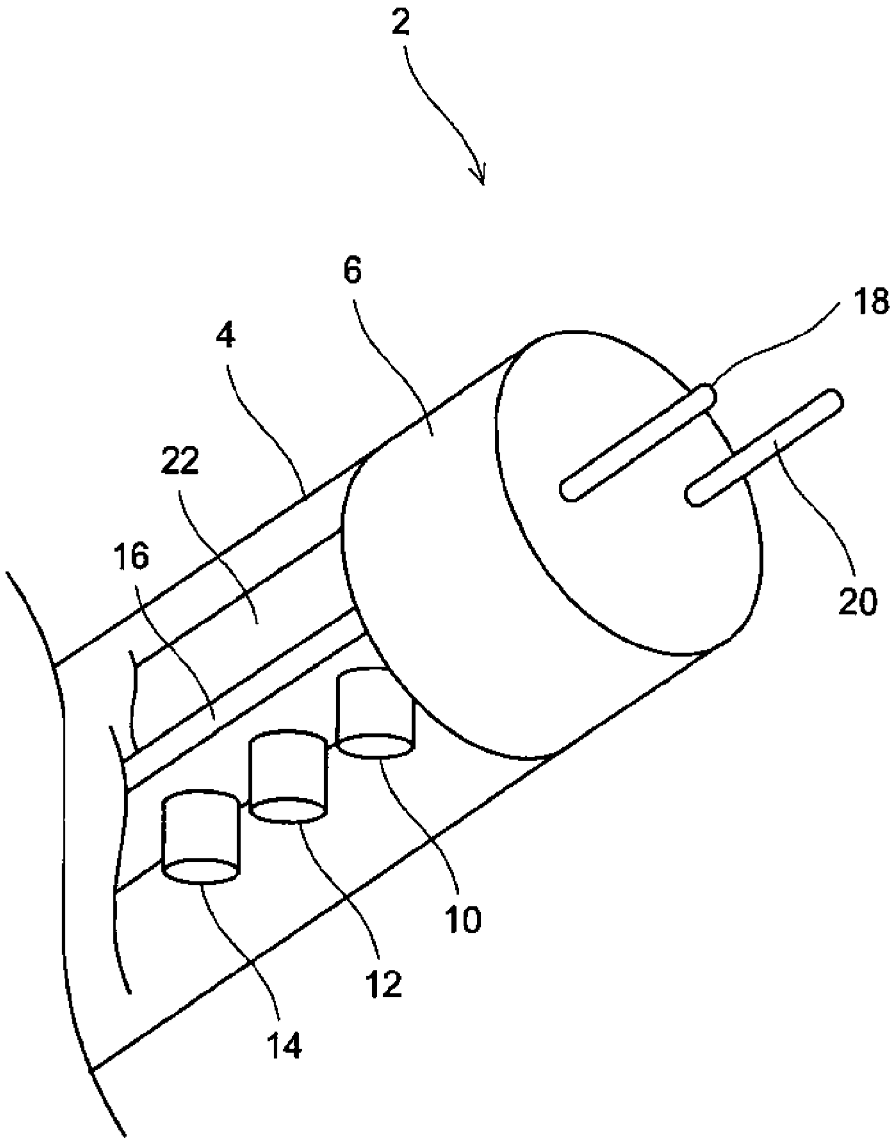
FIG. 2 is a partial perspective view illustrating an inner structure of FIG. 1.

FIG. 2 is a partial perspective view illustrating an inner structure of FIG. 1, and the same part is denoted by the same numeral. FIG. 2 illustrate the linear tube portion 4 as transparent so that the inside can be seen as necessary for description, but the real linear tube portion 4 has milky-white color with diffusional permeability so that the inside cannot be seen. White color LEDs 10, 12, 14, and so on are fixed to a substrate 16, and their light emission direction is fixed to have a predetermined angle relationship with the direction of two connection pins 18 and 20. Thus, for example, when the two connection pins 18 and 20 are connected to the illumination instrument so as to be arranged in the horizontal direction, the light emission direction of the white color LEDs 10, 12, 14, and so on becomes downward. On the backside of the substrate 16, there is disposed a heat sink plate 22 made of aluminum or the like, so as to prevent a decrease in light emission efficiency due to heat generation of the white color LEDs 10, 12, 14, and so on.

Figure 3:
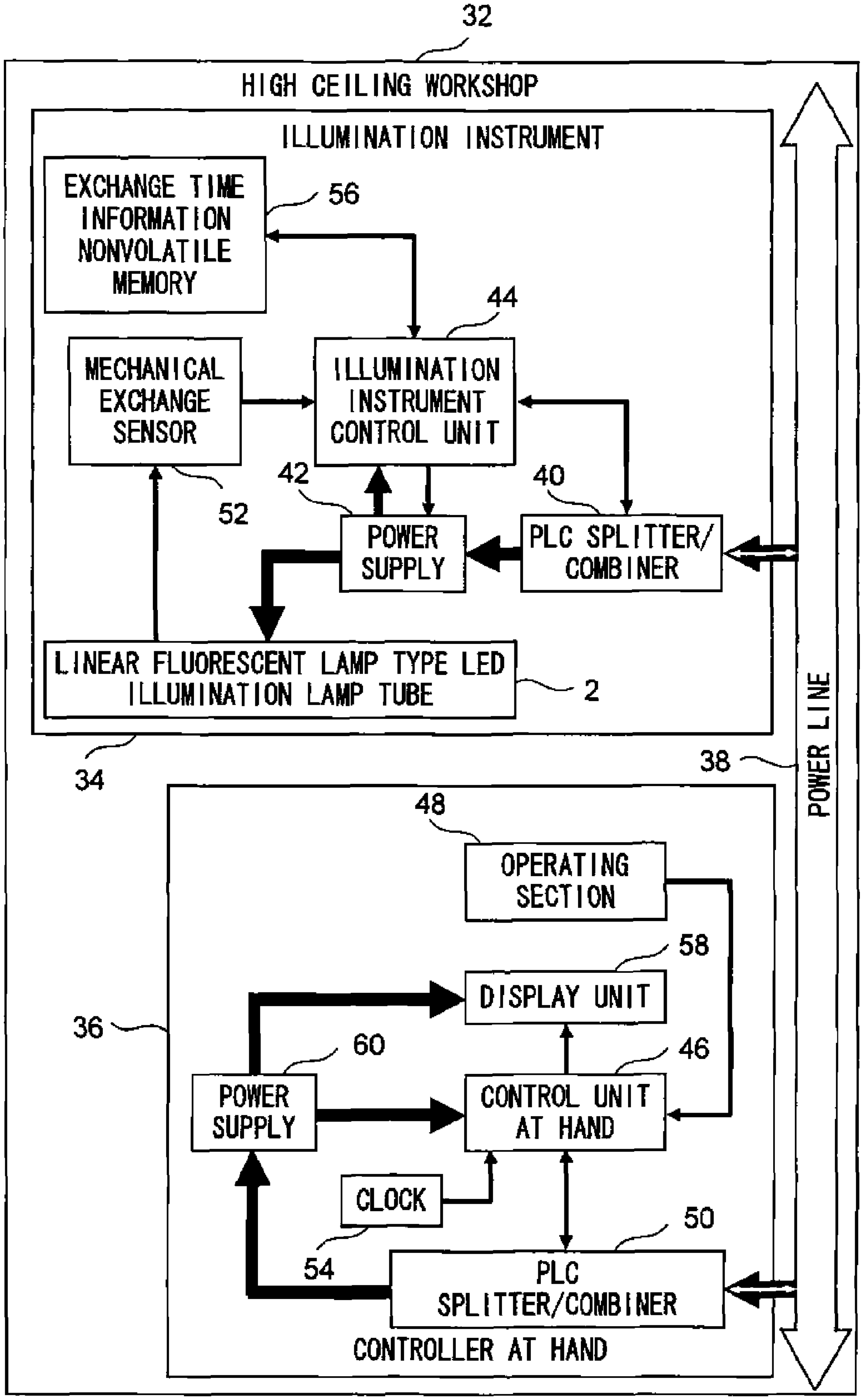
FIG. 3 is a block diagram illustrating Example 1 of an illumination system according to the present invention including the LED illumination lamp tube.

FIG. 3 is a block diagram illustrating Example 1 of an illumination system according to the present invention including the LED illumination lamp tube 2 illustrated in FIGS. 1 and 2. The illumination system includes an illumination instrument 34 disposed on the ceiling of a workshop 32, and a controller at hand 36 for controlling the ON/OFF and the like of the illumination instrument 34. The workshop 32 has the high ceiling and is in an environment where maintenance of the illumination instrument 34 or replacement of the LED illumination lamp tube 2 is not easy. The illumination instrument 34 and the controller at hand 36 are supplied with electric power via a power line 38. Note that, as described later, the power line 38 is also used as a communication path of a signal by power line carrier communication (PLC).

The LED illumination lamp tube 2 that is attached to the illumination instrument 34 in a detachable manner has a structure as illustrated in FIGS. 1 and 2. Note that although the LED illumination lamp tube 2 is attached in FIG. 3, an ordinary linear fluorescent lamp tube can also be attached to the illumination instrument 34 instead of the LED illumination lamp tube 2. The LED illumination lamp tube 2 is supplied with electric power for lighting from a power supply 42 via the power line 38 and a PLC splitter/combiner 40.

An illumination instrument control unit 44 is supplied with electric power from the power supply 42 and controls the power supply 42 so that the LED illumination lamp tube 2 is turned on and off responding to a ON/OFF signal split from the power line 38 by the PLC splitter/combiner 40. This ON/OFF signal is combined to the power line 38 from the controller at hand 36 and is transmitted to the illumination instrument 32 via the power line 38. Specifically, a control unit at hand 46 of the controller at hand 36 detects ON/OFF manual operation in an operating section 48, which is combined to the power line 38 by a PLC splitter/combiner 50.

FIG. 3 illustrates power supplying paths between blocks described above by thick arrow lines, and signal paths with thin arrow lines. In addition, between the power line 38 and the PLC splitter/combiner 40, electric power and signals are transmitted via the same power line. Therefore, they are illustrated by a thick arrow line and a white thin arrow line, respectively. This illustration rule is the same in the description below.

Next, exchange management of the linear fluorescent lamp type LED illumination lamp tube 2 is described. As described above, the workshop 32 has the high ceiling and is in an environment where maintenance of the illumination instrument 34 or replacement of the LED illumination lamp tube is not easy. In this point, the LED illumination lamp tube 2, which has much longer life than the ordinary fluorescent lamp tube, does not need to be exchanged for a long term, so it is suitable for use in such an environment. However, on the contrary, if the maintenance free state lasts long, storage or record of the last exchange may disappear with high probability. Therefore, it is a question how to manage the next exchange time. Further, in the case of the ordinary fluorescent lamp tube, an apparently abnormal ON state or a disabled state occurs in the end of life thereof, so it is clear that the exchange is necessary. On the contrary, the LED illumination lamp tube 2 only decreases its intensity gradually and does not cause an apparently abnormal state or a disabled state in long term use. Therefore, workers under such illumination may not perceive the decrease in luminous intensity and may work in an environment of insufficient luminous intensity without notice it as a result.

In order to cope with this problem, in Example 1 of the illumination system according to the present invention illustrated in FIG. 3, each attachment portion of the illumination instrument 32 is provided with a mechanical exchange sensor 52 which mechanically detects that each of the linear fluorescent lamp type LED illumination lamp tubes 2 is attached to the illumination instrument 32. This attachment detection result of the linear fluorescent lamp type LED illumination lamp tube 2 by the mechanical exchange sensor 52 is transmitted to the illumination instrument control unit 44. Responding this, the illumination instrument control unit 44 makes communication with the control unit at hand 46 via the power line 38 and requests to output the present date information obtained from a clock 54. The illumination instrument control unit 44 receives the date information via the power line 38 and controls an exchange time information nonvolatile memory 56 to store the received date information and an ID of the mechanical exchange sensor 52. Thus, the date when each of the linear fluorescent lamp type LED illumination lamp tubes 2 is attached is stored in the illumination instrument 32. In this way, the structure, in which the exchange time information nonvolatile memory 56 is provided to the illumination instrument 34 for storing the attachment information of the linear fluorescent lamp type LED illumination lamp tube 2 detected by the mechanical exchange sensor 52, enables to support exchange of the linear fluorescent lamp type LED illumination lamp tube 2 without special exchange time information, so that the versatility is enhanced.

When the operation of specifying the ID of the mechanical exchange sensor 52 and checking the exchange time of a specific linear fluorescent lamp type LED illumination lamp tube 2 is performed by the operating section 48, the control unit at hand 46 communicates with the illumination instrument control unit 44 via the power line 38. Then, exchange date information of the linear fluorescent lamp type LED illumination lamp tube 2 corresponding to the specified mechanical exchange sensor 52 is read out from the exchange time information nonvolatile memory 56 and is output to the power line 38. The control unit at hand 46 receives the information and compares the information with the present date information of the clock 54. If the exchange time has come, the fact is displayed on a display unit 58. A power supply 60 supplies electric power from the power line 38 to the control unit at hand 46 and the display unit 58 via the PLC splitter/combiner 50.

Figure 4:
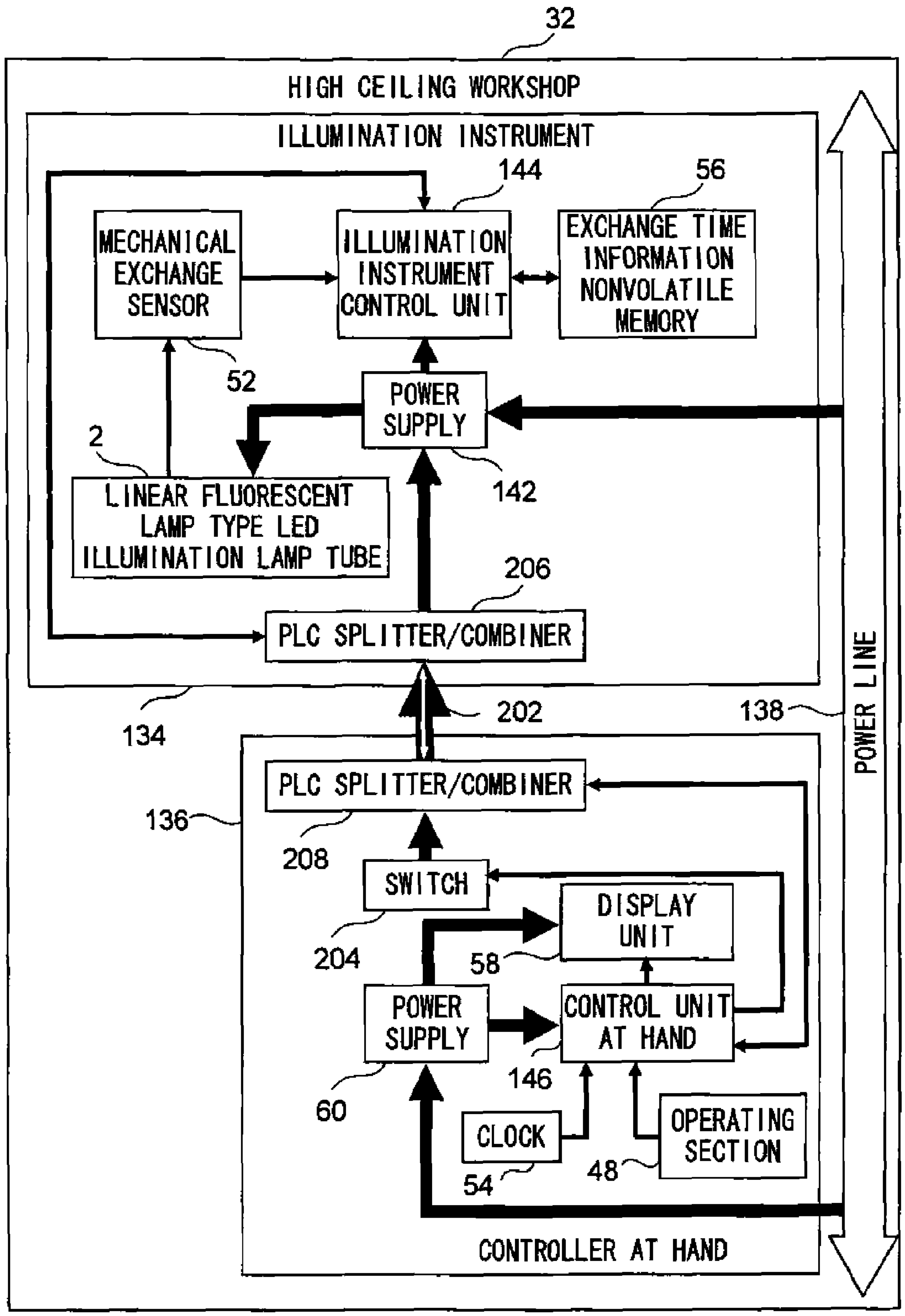
FIG. 4 is a block diagram illustrating Example 2 of the illumination system according to the present invention including the LED illumination lamp tube.

FIG. 4 is a block diagram illustrating Example 2 of the illumination system according to the present invention including the LED illumination lamp tube 2 illustrated in FIGS. 1 and 2. The structure thereof has many similarities to FIG. 3, and the same portion is denoted by the same numeral so that the description thereof is omitted unless otherwise necessary. In addition, the portion having a function corresponding to FIG. 3 though details are different is denoted by the hundreds numeral having the same last two digits so as to show the correspondence between them. Example 2 illustrated in FIG. 4 is different from Example 1 illustrated in FIG. 3 in that the communication between an illumination instrument 134 and a controller at hand 136 is performed not via a power line 138 for the power line carrier communication but via a switch control line 202 for the power line carrier communication. Note that the switch control line 202 is not the general-purpose power line 138, but becomes a part of the power supplying path to the illumination instrument 134 when the switch is turned on. Therefore, in this specification, it is also referred to as the power line carrier communication. Details of the difference will be described later.

In Example 1 illustrated in FIG. 3, the ON/OFF signal of the illumination instrument 34 is transmitted via the general-purpose power line 38, and there is no switch control line dedicated for the illumination instrument 34. However, in Example 2 illustrated in FIG. 4, as described above, the ON/OFF signal of the illumination instrument 34 is transmitted via the dedicated switch control line 202. Specifically, similarly to the ordinary illumination instrument, a part of the power supplying path from the power line 138 to the linear fluorescent lamp type LED illumination lamp tube 2 is led out in a power supply 142 and is connected to a switch 204 via the switch control line 202. Therefore, when the switch 204 is turned on, the power supplying path from the power line 138 to the linear fluorescent lamp type LED illumination lamp tube 2 is closed so that the linear fluorescent lamp type LED illumination lamp tube 2 is turned on. Further, when the switch 204 is turned off, the power supplying path is opened so that the linear fluorescent lamp type LED illumination lamp tube 2 is turned off.

A PLC splitter/combiner 206 is disposed between the part where the switch control line 202 is led in the illumination instrument 134 and the power supply, so as to combine the signal from an illumination instrument control unit 144 to the switch control line 202 and so as to split the signal on the switch control line and send the split signal to the illumination instrument control unit 144. On the other hand, a PLC splitter/combiner 208 is disposed between the part where the switch control line 202 is led in the controller at hand 136 and the switch 204, so as to combine a signal from the control unit at hand 146 to the switch control line 202 and so as to split the signal on the switch control line and send the split signal to the control unit at hand 146.

With the structure described above, the control unit at hand 146 of the controller at hand 136 detects the ON/OFF manual operation by the operating section 48 and turns on or off the switch 204 based on the detection result. Thus, the power supplying path from the power line 138 to the linear fluorescent lamp type LED illumination lamp tube 2 is closed or opened, so that the linear fluorescent lamp type LED illumination lamp tube 2 is turned on or off. On the other hand, communication between the illumination instrument control unit 144 and the control unit at hand 146 for writing date in the exchange time information nonvolatile memory 56 when attachment of the linear fluorescent lamp type LED illumination lamp tube 2 is detected, as well as communication between the illumination instrument control unit 144 and the control unit at hand 146 for checking the exchange time when the operating section 48 is operated, is performed via the switch control line 202, the PLC splitter/combiner 206, and the PLC splitter/combiner 208.

Figure 5:
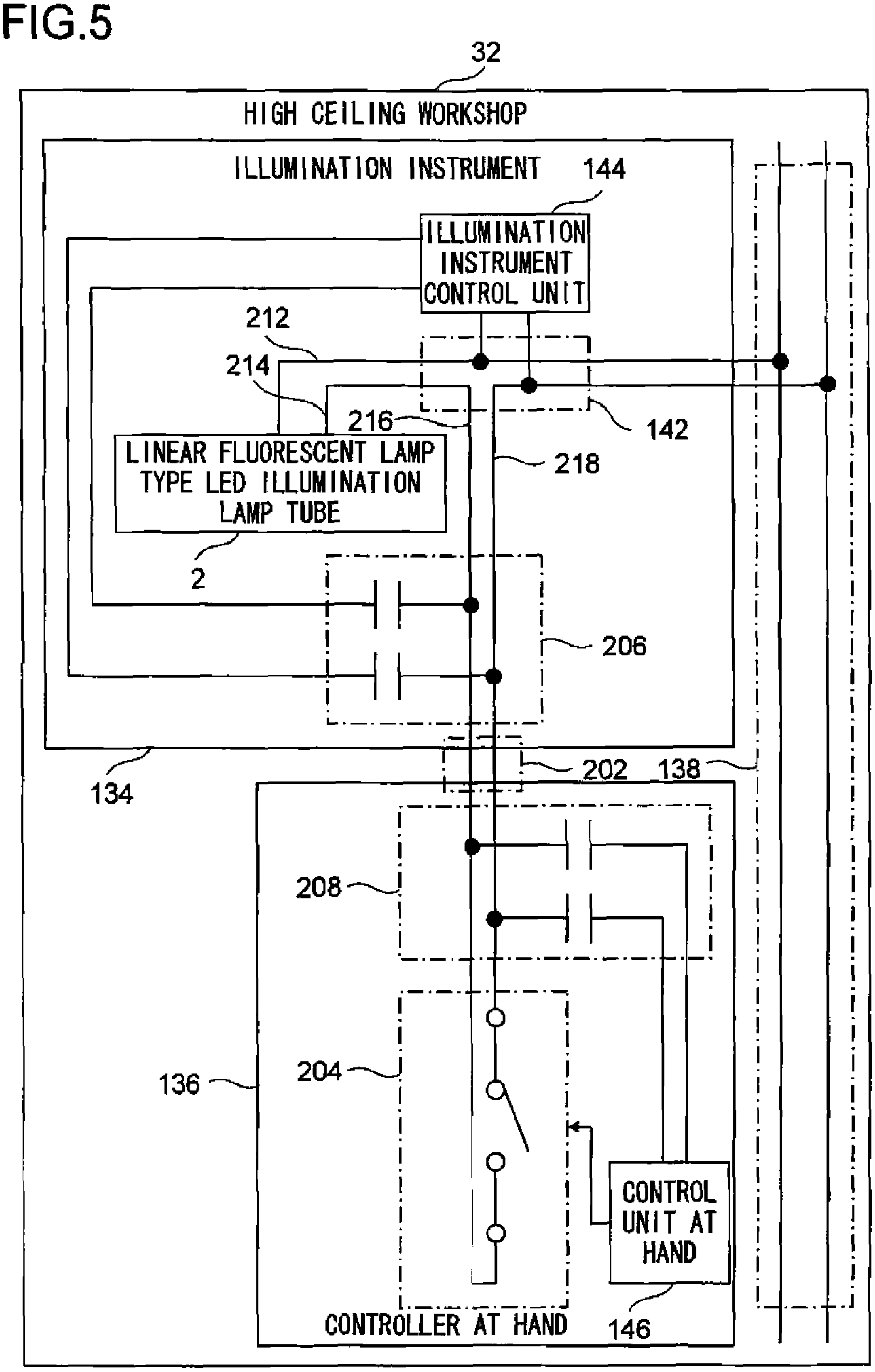
FIG. 5 is a block diagram illustrating details of communication via a switch control line in Example 2 illustrated in FIG. 4.

FIG. 5 is a block diagram aiming to illustrate details of the power line carrier communication via the switch control line 202 in Example 2 illustrated in FIG. 4, in which the same structure is denoted by the same numeral. In addition, a part of the structure illustrated in FIG. 4 that is not related to the above-mentioned aim is omitted in FIG. 5. As apparent from FIG. 5, as to the power line led in from the power line 138, a first line 212 thereof is directly connected to the linear fluorescent lamp type LED illumination lamp tube 2, while a second line 214 thereof is led out as a first switch control line 216 and a second switch control line 218 in the power supply 142 so as to be connected to the switch 204. Therefore, when the switch 204 is closed, the first switch control line 216 and the second switch control line 218 are connected so that the linear fluorescent lamp type LED illumination lamp tube 2 is turned on. Further, when the switch 204 is opened, the first switch control line 216 and the second switch control line 218 are disconnected so that the linear fluorescent lamp type LED illumination lamp tube 2 is turned off.

The PLC splitter/combiners 206 and 208 transmit only high frequency components of the first switch control line 216 and the second switch control line 218 to the illumination instrument control unit 144 and the control unit at hand 146, respectively. Thus, communication between the illumination instrument control unit 144 and the control unit at hand 146 is enabled. However, when the switch 204 is closed, the first switch control line 216 and the second switch control line 218 become the same potential. Therefore, the communication is performed in the state where the switch 204 is opened so that the first switch control line 216 and the second switch control line 218 are disconnected, and the linear fluorescent lamp type LED illumination lamp tube 2 is turned off.

Figure 6:
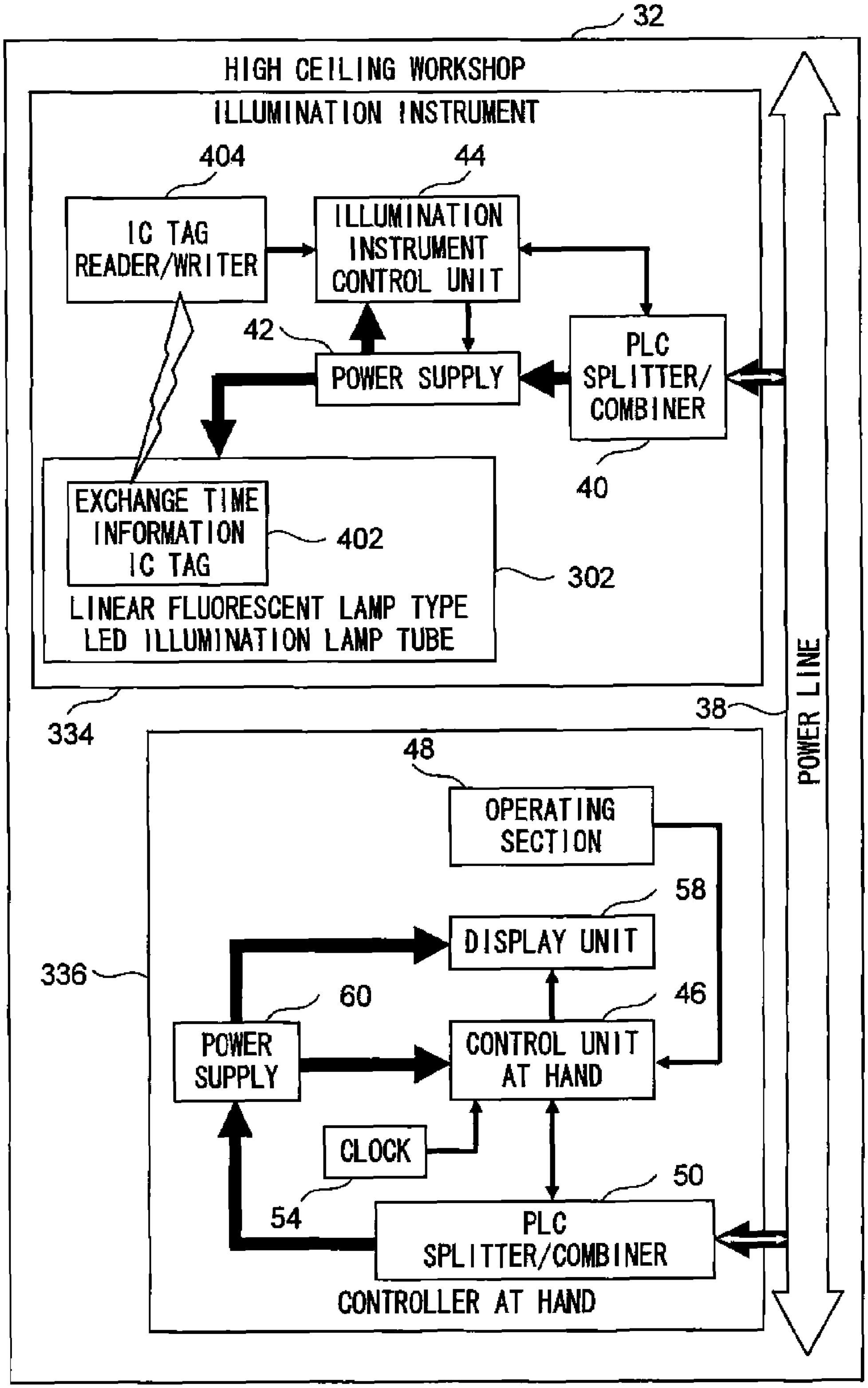
FIG. 6 is a block diagram illustrating Example 3 of the illumination system according to the present invention including the LED illumination lamp tube.

FIG. 6 is a block diagram illustrating Example 3 of the illumination system according to the present invention including the LED illumination lamp tube 2 illustrated in FIGS. 1 and 2. The structure thereof is similar to that illustrated in FIG. 3 in many portions, and the same portion is denoted by the same numeral so that the description thereof is omitted unless otherwise necessary. In addition, the portion having a function corresponding to FIG. 3 though details are different is denoted by the three hundreds having the same last two digits so as to show the correspondence between them.

The structure of a controller at hand 336 of Example 3 illustrated in FIG. 6 is the same as that of Example 1 illustrated in FIG. 3. In contrast, as to an illumination instrument 334, a linear fluorescent lamp type LED illumination lamp tube 302 includes an exchange time information IC tag 402, and an IC tag reader/writer 404 which reads and writes the information without contact is disposed in the illumination instrument 334. The ID and the manufacture date of the linear fluorescent lamp type LED illumination lamp tube 302 are stored in the exchange time information IC tag 402 stores upon shipping.

In Example 3, when an operation of specifying the ID of the linear fluorescent lamp type LED illumination lamp tube 302 and checking the exchange time thereof is performed by the operating section 48, the control unit at hand 46 communicates with the illumination instrument control unit 44 via the power line 38. Then, the IC tag reader/writer 404 reads the manufacture date information of the linear fluorescent lamp type LED illumination lamp tube 2 from the exchange time information IC tag 402 and outputs the read information to the power line 38. Receiving the information, the control unit at hand 46 compares the received information with the present date information of the clock 54. If the exchange time has come, the fact is displayed on the display unit 58.

As described above, decision of the exchange time in Example 3 is performed not based on the actual use start time but based on the shipping time of the linear fluorescent lamp type LED illumination lamp tube 302. In this way, in Example 3, the exchange management is performed without taking account of a difference between the shipping time and the use start time, provided that the life of the linear fluorescent lamp type LED illumination lamp tube 302 is very long. It is considered that the linear fluorescent lamp type LED illumination lamp tube 302 was purchased as a stock and has been stored without using for a long period. However, the linear fluorescent lamp type LED illumination lamp tube 302 has a long life and does not become disabled suddenly. Therefore, the above-mentioned management can be performed assuming such long term storage is not performed.

In the management case described above, the required function of the IC tag reader/writer 404 is only a read function, so it can be configured as an IC tag reader. However, also in Example 3 illustrated in FIG. 6, similarly to Example 1 illustrated in FIG. 3, it is possible to adopt the control in which attachment of the linear fluorescent lamp type LED illumination lamp tube 302 is detected when it is attached, date information of the attachment is obtained from the clock 54, and the date information in the exchange time information IC tag is overwritten.

In addition, transmission of the exchange time information in Example 3 illustrated in FIG. 6 may be performed not only via the power line 38 but also via the switch control line 202 for the power line carrier communication as Example 2 illustrated in FIGS. 4 and 5. In this case, the structure described above with reference to FIG. 5, in which the communication is performed when the switch is turned off, is significant in that the information in the IC tag can be read without contact and without influence of noise during the linear fluorescent lamp type LED illumination lamp tube 302 is turned on.

Figure 7:
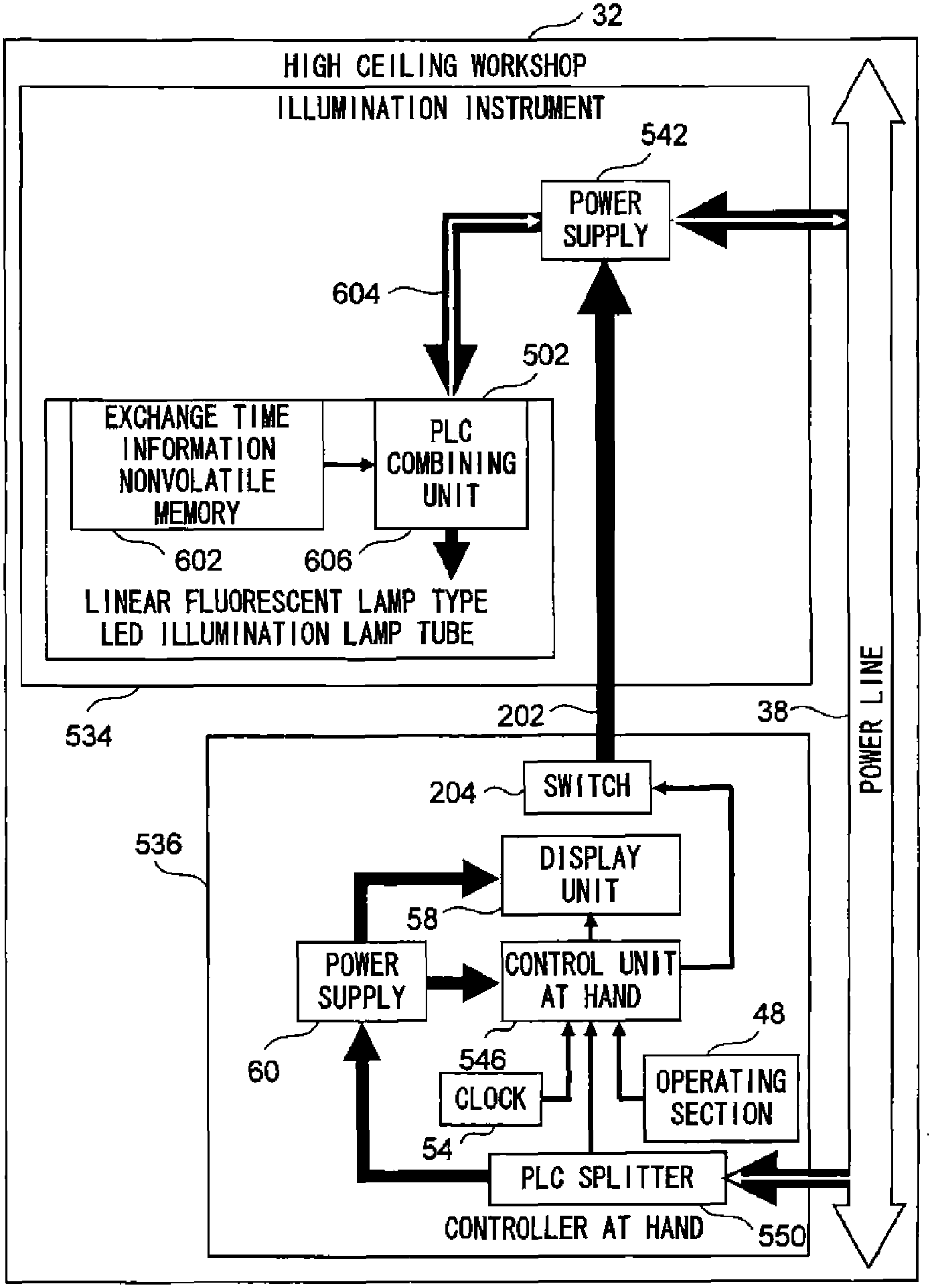
FIG. 7 is a block diagram illustrating Example 4 of the illumination system according to the present invention including the LED illumination lamp tube.

FIG. 7 is a block diagram illustrating Example 3 of the illumination system according to the present invention including the LED illumination lamp tube 2 illustrated in FIGS. 1 and 2. The same portion as that in Examples described above is denoted by the same numeral so that the description thereof is omitted unless otherwise necessary. In addition, the same portion as Examples describe above though details are different is denoted by the five hundreds numeral having the same last two digits so as to show the correspondence between them. As to Example 4 illustrated in FIG. 7, a linear fluorescent lamp type LED illumination lamp tube 502 includes an exchange time information nonvolatile memory 602, in which the ID and the manufacture date are stored in the same manner as in Example 3 illustrated in FIG. 6. The linear fluorescent lamp type LED illumination lamp tube 502 further includes a PLC combining unit 606 which reads out the manufacture date information from the exchange time information nonvolatile memory 602 and combines the same to a power line 604.

A controller at hand 536 in Example 4 illustrated in FIG. 7 has the switch 204 that is connected to the switch control line 202 led out from a power supply 542 of an illumination instrument 534 similarly to Example 2 illustrated in FIG. 4, and turns on and off the same by control of a control unit at hand 546 responding to the operation by the operating section 48, so as to control ON and OFF of the linear fluorescent lamp type LED illumination lamp tube 502. However, unlike FIG. 4, the communication between the controller at hand 536 and the illumination instrument 534 is performed not via the switch control line 202 but via the power line 38 in the same manner as Example 1 illustrated in FIG. 3. Therefore, the power supply 60 is connected to the power line 38 via a PLC splitting unit 550.

In Example 4 illustrated in FIG. 7, when the operation of specifying the ID of the linear fluorescent lamp type LED illumination lamp tube 502 and checking the exchange time thereof is performed by the operating section 48, the control unit at hand 546 obtains information from the illumination instrument 534 via the power line 38. Specifically, the manufacture date information of the linear fluorescent lamp type LED illumination lamp tube 502 of the corresponding ID output from the PLC combining unit 606 to the power line 38 is obtained from the PLC splitting unit 550. The control unit at hand 546 compares the obtained manufacture date information with the present date information of the clock 54. If the exchange time has come, the fact is displayed on the display unit 58. Thus, also in Example 4, similarly to Example 3, decision of the exchange time is performed with reference not to the actual use start time but to the shipping time of the linear fluorescent lamp type LED illumination lamp tube 502. In the case of Example 4 described above, because the linear fluorescent lamp type LED illumination lamp tube 502 includes the structure for delivering the information, the illumination instrument 534 is not required to have a special structure for managing the exchange time, so that the conventional illumination instrument can also be used for the embodiment.

Figure 8:
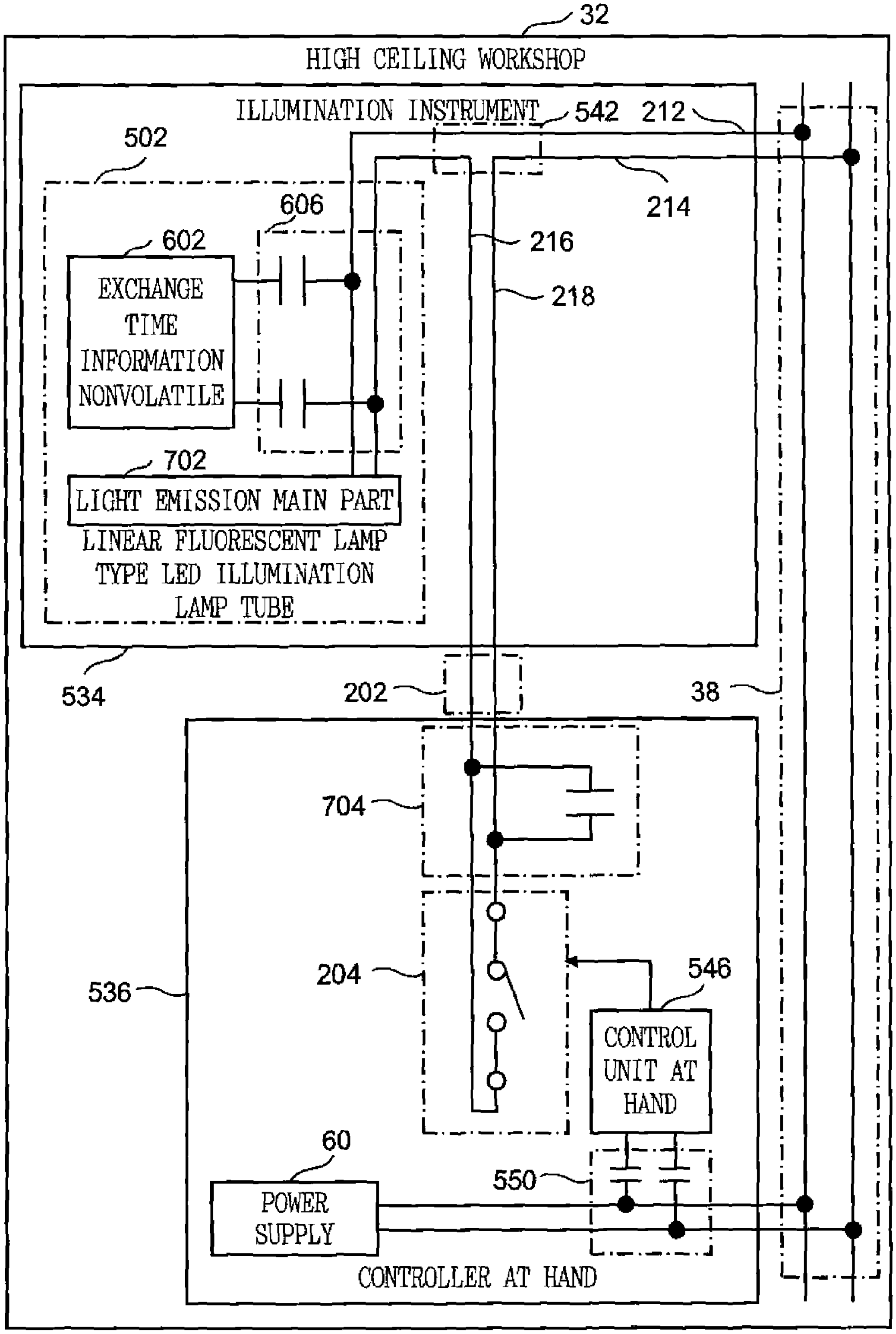
FIG. 8 is a block diagram illustrating details of power line carrier communication in Example 4 illustrated in FIG. 7.

FIG. 8 is a block diagram aiming to illustrate details of the power line carrier communication in Example 4 illustrated in FIG. 7, and the corresponding structure is denoted by the same numeral. In addition, a part of the structure illustrated in FIG. 7, which is not related to the above-mentioned aim, is omitted in FIG. 8. Similarly to FIG. 5, as to the power line led in from the power line 38 illustrated in FIG. 8 too, the first line 212 is directly connected to a light emission main part 702 of the linear fluorescent lamp type LED illumination lamp tube 502, while the second line 214 is led out as a first switch control line 216 and a second switch control line 218 in the power supply 542 so as to be connected to the light emission main part 702 via the switch 204. In this way, ON or OFF of the linear fluorescent lamp type LED illumination lamp tube 502 accompanying ON or OFF of the switch 204 can be controlled similarly to FIG. 5.

The PLC combining unit 606 and the PLC splitting unit 550 combine and split only a high frequency signal component to and from the power line 38. Note that the second line 214 of the power line 38 is connected to the switch 204 as described above. Therefore, if the switch 204 is opened, a signal line from the PLC combining unit 606 to the power line 38 cannot be secured. Therefore, a high frequency coupler 704 which transmits only high frequencies is disposed between the first switch control line 216 and the second switch control line 218, so that date information can be delivered to the power line 38 even in the state where the switch 204 is opened and the linear fluorescent lamp type LED illumination lamp tube 502 is turned off. Because the high frequency coupler 704 can also be disposed in the controller at hand 536, the illumination instrument 534 is not required to have a special structure for managing the exchange time, and the conventional illumination instrument can also be used for the embodiment.

Figure 9:
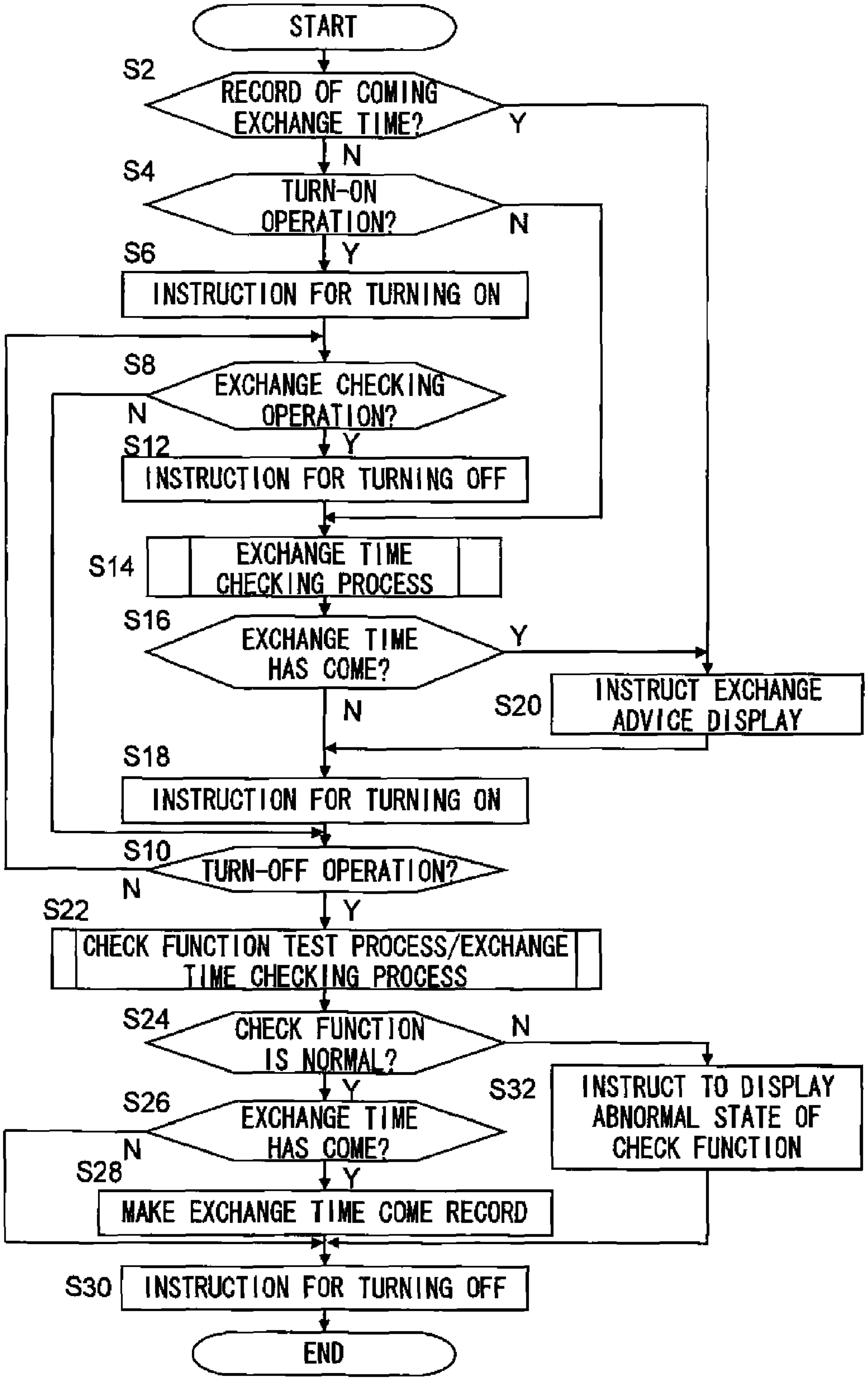
FIG. 9 is a flowchart of a function of a control unit at hand in each Example.

FIG. 9 is a flowchart of a function of the control unit at hand 46, 146, 546 and the like in the examples described above. The process flow starts when the operating section 48 of the controller at hand is operated in the state where the linear fluorescent lamp type LED illumination lamp tubes 2, 302, 502 and the like are turned off. First, in Step S2, it is checked whether or not there is a record indicating that the exchange time has come in the past turn-on. The function for performing this record will be described later. If there is no record, the process flow goes to Step S4 in which it is checked whether the operation of the operating section 48 was the turn-on operation. If it is the turn-on operation, an instruction is issued in Step S6 for turning on the linear fluorescent lamp type LED illumination lamp tubes 2, 302, 502 and the like.

Next in Step S8, it is checked whether or not an exchange checking operation is performed by the operating section 48, which is an operation of checking whether or not to exchange the linear fluorescent lamp type LED illumination lamp tubes 2, 302, 502 and the like. If there is not the operation, the process flow goes to Step S10 in which it is checked whether or not there is a turn-off operation by the operating section 48. If there is no turn-off operation, the process flow goes back to Step S8 in which it is checked whether or not an exchange checking operation is performed. After that, the process of Step S8 and Step S10 is repeated unless the exchange checking operation and the turn-off operation are performed. This is the operation during the period while the linear fluorescent lamp type LED illumination lamp tubes 2, 302, 502 and the like are turned on.

Here, if it is detected in Step S8 that the exchange checking operation is performed, the process flow goes to Step S12, in which an instruction is issued for turning off the linear fluorescent lamp type LED illumination lamp tubes 2, 302, 502 and the like, and the process flow goes to Step S14 in which the exchange time is checked. The process in Step S14 is, as described above, to acquire the date information from the illumination instrument and to compare it with the present date information. Then in Step S16, based on the comparison result, it is checked whether or not the exchange time has come. If the exchange time has not come, the process flow goes to Step S18 in which an instruction is issued for turning on the linear fluorescent lamp type LED illumination lamp tubes 2, 302, 502 and the like, and the process flow goes to Step S10. The tune-off operation in Step S12 has a meaning of avoiding noise or the like to the succeeding exchange time checking process as described above. Such temporary turn-off for the exchange time checking process has also a meaning as an alarm indicating that the check of the exchange time is securely performed also in the case where the exchange time has not come. It is because if there is no apparent change in the turn-on state, it cannot be distinguished whether the exchange time has not come or the checking is failed. By performing this natural turn-off and relighting, in the normal state of lasting without coming of the exchange time for a long period of time, it is possible to avoid inconvenience of repeating a special display "Exchange time has not come" or the like.

In addition, if the operation by the operating section 48 checked in Step S4 is not the turn-on operation, it means to be the exchange checking operation, so the process flow goes directly to Step S14 without issuing the instruction. In this case, if it is not detected in Step S16 that the exchange time has come after performing the exchange time checking process in Step S14, the turn-on instruction is issued in Step S18. In other words, when the process flow starts by the operation with the operating section 48, regardless of the operation, if the exchange time has not come, the instruction is issued in Step S18 for turning on the linear fluorescent lamp type LED illumination lamp tubes 2, 302, 502 and the like.

On the other hand, if it is detected in Step S16 that the exchange time has come, the process flow goes to Step S20, in which an exchange advice display is instructed in the display unit 58, and the process flow goes to Step S18. In addition, also in the case where there is the record indicating that the exchange time has come in Step S2, the process flow goes directly to Step S20, in which the exchange advice display is instructed in the display unit 58, and the process flow goes to Step S18.

Next, the process in the turn-off is described. If the turn-off operation by the operating section 48 is detected in Step S10, the process flow goes to Step S22 in which a function test process in the exchange time checking process and the exchange time checking process are performed. The exchange advice display is performed when a long period of time has passed after exchange of the linear fluorescent lamp type LED illumination lamp tubes 2, 302, 502 and the like. If there is no guarantee that the function of the exchange time checking process is maintained until the time, there is no reliability in a future time of need. Therefore, every time when the turn-off operation is performed, a date information read communication test from the illumination instrument by the controller at hand and a comparison function test by the control unit at hand, and a display function test by the display unit are performed in Step S22. On the other hand, every time when the turn-off operation is performed, the exchange time checking process is performed in Step S22, so as to display automatically that the exchange time has come when it comes even if there is no manual operation for the exchange check.

When the process in Step S22 is finished, based on the result, it is checked in Step S24 whether or not the check function is normal. If the function is normal, it is checked in the next Step S26 whether or not the exchange time has come. As a result, if the exchange time has come, the process flow goes to Step S30 after making an exchange time come record. Then, an instruction is issued for turning off the linear fluorescent lamp type LED illumination lamp tubes 2, 302, 502 and the like, and the process flow is finished. In this case, the left exchange time come record is detected in Step S2 when the next operation by the operating section 48. In this way, in the automatic detection after the turn-off operation, even if it is detected that the exchange time has come, the fact is not displayed at once but is displayed when the next operation is performed. It is because that the turn-off operation is usually performed when work is finished, and it is considered that concern to the illumination device is weakened at that time. Further, if it is not detected in Step S26 that the exchange time has come, nothing is recorded and the process flow goes directly to Step S30 in which the instruction for turning off is issued and the process flow is finished.

On the other hand, if it is not detected in Step S24 that the check function is normal, the process flow goes promptly to Step S32, in which it is instructed to display the abnormal state of the check function, and the process flow goes to Step S30. The abnormal state of the check function can occur any time unlike coming of the exchange time after a long period of time. In addition, if the abnormal state is detected, a countermeasure should be taken promptly. Therefore, if the abnormal state is detected after the turn-off operation as described above, the fact is displayed promptly.

Hereinafter, overall technical features disclosed in this specification will be described.

First, according to the technical feature disclosed in this specification, an illumination device is provided, which includes an illumination instrument to which an LED illumination lamp can be attached, and a controller having a control unit which remote controls turn-on of the LED illumination lamp and a receiving unit which receives information about exchange time of the LED illumination lamp from the illumination instrument. Thus, it is possible to grasp information about exchange time of the LED illumination lamp installed on a high ceiling or the like, using the controller at hand for remote controlling the illumination instrument.

The LED illumination lamp has much longer life than that of an ordinary fluorescent lamp tube, so it can be used for a long period of time without exchange. Therefore, it is suitable for installing on a high ceiling where exchanging work is not easy. However, if the maintenance free state lasts long, storage or record about the exchange of the last time may disappear with high probability. Further, an apparently abnormal ON state or a disabled state occurs in the end of life of the ordinary fluorescent lamp tube so that necessity of the exchange can be perceived clearly, but the LED illumination lamp tube only decreases its intensity gradually and does not cause an apparently abnormal state or a disabled state in long term use. Therefore, workers may work in an environment of insufficient luminous intensity without noticing it as a result. Note that the above-mentioned feature described in this specification enables to grasp information about exchange time of the LED illumination lamp easily by the controller at hand that is used daily, in the use of the LED illumination lamp tube.

In addition, according to the specific feature described in this specification, the illumination instrument includes a storage unit which stores the information about exchange time of the LED illumination lamp. Thus, even if the LED illumination lamp does not have the function of storing the information about exchange time, the information about exchange time can be kept and transmitted to the controller as necessary. Further, according to the specific feature, when the LED illumination lamp is attached, the storage unit stores the information about exchange time such as date information when the attachment is performed.

In addition, according to another specific feature described in this specification, the illumination instrument includes an acquiring unit which acquires the information about exchange time stored in the LED illumination lamp from the LED illumination lamp. In this way, if it is a precondition that the LED illumination lamp itself has the information about exchange time, the illumination instrument is not required to have special information store means, and it is sufficient that the illumination instrument can acquire the information and send the same to the controller. Therefore, the structure of the illumination instrument can be simplified.

In addition, according to another specific feature described in this specification, the control line from the control unit to the illumination instrument is shared as the transmission line of the information about exchange time of the LED from the illumination instrument to the receiving unit. In this way, by sharing the control line that is originally necessary for the illumination instrument as the transmission line, information about exchange time of the LED can be transmitted from the illumination instrument to the receiving unit without providing special signal transmission means. In addition, according to the more specific feature described in this specification, the power line is shared as the control line and the transmission line. According to another more specific feature, the switch control line for controlling turn on and off of the LED illumination lamp is shared as the control line and the transmission line.

In addition, according to another feature described in this specification, an illumination device is provided which includes a storage unit which stores information about exchange time of the LED illumination lamp, a control unit which controls the storage unit to store the information about exchange time when the LED illumination lamp is attached, and a transmitting unit which transmits externally the information about exchange time of the LED illumination lamp stored in the storage unit. Thus, the information about exchange time can be stored even for the LED illumination lamp having no function of storing the information about exchange time, so that the information can be transmitted to the controller as necessary.

In addition, according to another feature described in this specification, an illumination device is provided which includes an acquiring unit which acquires the information about exchange time stored in the LED illumination lamp from the LED illumination lamp, and a transmitting unit which transmits externally the information about exchange time of the LED illumination lamp acquired by the acquiring unit. Thus, information about exchange time of the LED illumination lamp can be extracted externally from the illumination instrument to which the LED illumination lamp is attached, so that the information can be grasped.

In addition, according to another feature described in this specification, an illumination device is provided which includes an illumination instrument to which an LED illumination lamp can be attached, and a controller having a receiving unit which receives information about exchange time of the LED illumination lamp from the illumination instrument by power line carrier communication. Thus, information about exchange time of the LED illumination lamp installed on a high ceiling or the like can be easily grasped by power line carrier communication using the power line existing for supplying electric power to the illumination instrument.

In addition, according to another feature described in this specification, an illumination device is provided which includes an illumination instrument to which an LED illumination lamp can be attached, and a controller having a receiving unit which receives information about exchange time of the LED illumination lamp from the illumination instrument by communication via a switch control line for controlling the illumination instrument. Thus, information about exchange time of the LED illumination lamp installed on a high ceiling or the like can be easily grasped using the switch control line existing for controlling the illumination instrument.

In addition, according to another feature described in this specification, an illumination device is provided which includes an illumination instrument to which an LED illumination lamp can be attached, and a controller having a receiving unit which receives information about exchange time of the LED illumination lamp from the illumination instrument during OFF period of the LED illumination lamp. Thus, transmission of the information about exchange time of the LED illumination lamp from the illumination instrument can be realized by simple information transmission means that can be affected by noise or the like during ON period of the LED illumination lamp, so that a target function can be provided at low cost. According to according more specific feature, the controller controls the LED illumination lamp to be OFF state before receiving the information about exchange time of the LED illumination lamp by the receiving unit. In addition, according to another more specific feature, the controller automatically controls the LED illumination lamp to be ON state after receiving the information about exchange time of the LED illumination lamp by the receiving unit.

In addition, according to another feature described in this specification, an illumination device is provided which includes an illumination instrument to which an LED illumination lamp can be attached, and a controller having a receiving unit which receives information about exchange time of the LED illumination lamp from the illumination instrument and a checking unit which automatically checks the function thereof. An alarm of exchange time of the LED illumination lamp is performed after a long time after the LED illumination lamp is attached. In order to prevent the alarm from being disabled at that time, according to the above-mentioned feature of the present invention, there is provided the checking unit which automatically and daily checks the function of the receiving unit.

In addition, according to another feature described in this specification, an illumination device is provided which includes an illumination instrument to which an LED illumination lamp can be attached, and a controller having a receiving unit which automatically receives information about exchange time of the LED illumination lamp from the illumination instrument in association with the turn-on control operation of the LED illumination lamp. An alarm of exchange time of the LED illumination lamp is performed after a long time after the LED illumination lamp is attached. During the time period, in order to support even the case where the operation method of checking the exchange time or the function itself is forgotten, according to the above-mentioned feature described in this specification, the receiving unit is provided which automatically receives daily the information about exchange time of the LED illumination lamp in association with the turn-on control operation of the LED illumination lamp.

In addition, according to another feature described in this specification, an illumination device is provided which includes an illumination instrument to which an LED illumination lamp can be attached, and a controller having a receiving unit which receives information about exchange time of the LED illumination lamp from the illumination instrument, a decision unit which decides the exchange time based on the received information, and a storage unit which stores the decision result. An alarm of exchange time of the LED illumination lamp is performed after a long time after the LED illumination lamp is attached. During the time period, frequent alarms indicating that the exchange time has not come may be bothering to the user. Therefore, according to the above-mentioned feature described in this specification, the storage unit is provided which stores the decision result of the exchange time, so that an alarm of the decision result can be issued at an appropriate timing based on the information stored in the storage unit.

In addition, according to another feature described in this specification, an LED illumination lamp is provided which includes an LED light emitting unit, a keeping unit which keeps information about exchange time, and a transmitting unit which transmits information about exchange time kept in the keeping unit to an illumination instrument. Thus, even if a storage unit which stores the information about exchange time is not specially provided to the illumination instrument itself, this information can be transmitted to the outside via the illumination instrument. In addition, because the information about exchange time is transmitted to the illumination instrument to which the LED illumination lamp is attached, even simple transmission means of a contact type, a very short distance noncontact type, or the like enables easy extraction of the information about exchange time kept in the LED illumination lamp. Thus, excess increase of cost of the LED illumination lamp or the illumination instrument due to addition of the exchange time check function can be avoided.

INDUSTRIAL APPLICABILITY

The present invention is a useful technique for providing an illumination device suitable for various use conditions.

EXPLANATION OF NUMERALS

2, 302, 502 LED illumination lamp
34, 134, 334, 534 illumination instrument
46, 48, 146, 204, 546 control unit
46, 50, 146, 208, 546, 550 receiving unit
36, 136, 336, 536 controller
56 storage unit
52 LED illumination lamp attachment detection unit
402, 602 information keeping unit in LED illumination lamp
404 acquiring unit
38 power line
202 switch control line
44, 144 control unit in illumination instrument
40, 44, 144, 206 transmitting unit
46, 146, 546 checking unit
46, 146, 546 decision unit
46, 146, 546 storage unit of decision result

What is claimed is:

1. An illumination device comprising:

an illumination instrument whose light source is an LED illumination lamp; and a controller that is separate from the illumination instrument, the controller including a receiving unit which has a receiving function to receive information about an exchange time of the LED illumination lamp from the illumination instrument, the controller configured to test automatically the receiving function of the receiving unit on a routine basis to ensure that the receiving unit reliably will receive the information to exchange the LED illumination lamp, wherein the controller receives the information about the exchange time of the LED illumination lamp from the illumination instrument during an OFF period of the LED illumination lamp after a long period of time has passed since a most recent exchange of the LED illumination lamp, and wherein the controller further includes a control unit which remotely controls turn-on/off of the LED illumination lamp, and wherein the controller tests automatically the receiving function of the receiving unit in association with the turn-off control of the LED illumination lamp by the control unit.

2. An illumination device according to claim 1, wherein the illumination instrument includes a storage unit which stores the information about exchange time of the LED illumination lamp.

3. An illumination device according to claim 2, wherein the LED illumination lamp is detachable from the illumination instrument, and the storage unit stores the information about exchange time when the LED illumination lamp is attached.

4. An illumination device according to claim 1, wherein the LED illumination lamp is detachable from the illumination instrument, and the illumination instrument includes an acquiring unit which acquires the information about exchange time stored in the LED illumination lamp from the LED illumination lamp.

5. An illumination device according to claim 1, wherein a control route from the controller to the illumination instrument is shared as a transmission route of the information about exchange time of the LED illumination lamp from the illumination instrument to the controller.

6. An illumination device according to claim 5, wherein the control route and the transmission route are a power line.

7. An illumination device according to claim 5, wherein the control route is a switch control signal transmission route for controlling on and off of the LED illumination lamp, and the switch control signal transmission route is shared as the transmission route for the information about exchange time of the LED illumination lamp.

8. An illumination device according to claim 1, wherein the LED illumination lamp is detachable from the illumination instrument, and the illumination instrument includes a storage unit which stores the information about exchange time of the LED illumination lamp, a control unit which controls the storage unit to store the information about exchange time when the LED illumination lamp is attached, and a transmitting unit which transmits externally the information about exchange time of the LED illumination lamp stored in the storage unit.

9. An illumination device according to claim 1, wherein the LED illumination lamp is detachable from the illumination instrument, and the illumination instrument includes an acquiring unit which acquires the information about exchange time stored in the LED illumination lamp from the LED illumination lamp, and a transmitting unit which transmits externally the information about exchange time of the LED illumination lamp acquired by the acquiring unit.

10. An illumination device according to claim 1, wherein the controller includes a display unit which performs a display based on the information about exchange time of the LED illumination lamp that is received.

11. An illumination device according to claim 10, wherein the display unit performs a display based on the information about exchange time of the LED illumination lamp in association with remote control of turn-on of the LED illumination lamp.

12. An illumination device according to claim 1, wherein the controller turns the LED illumination lamp into the OFF state before the controller starts to receive the information about exchange time of the LED illumination lamp.

13. An illumination device according to claim 1, wherein the controller waits to turn the LED illumination lamp into an ON state until the controller receives the information about exchange time of the LED illumination lamp.

14. An illumination device according to claim 1, wherein the controller includes a control unit which remotely controls turn-on of the LED illumination lamp, and automatically receives the information about exchange time of the LED illumination lamp from the illumination instrument in association with turn-on control of the LED illumination lamp by the control unit.

15. An illumination device according to claim 1, wherein the controller includes a display unit which displays a result of the automatic test of the receiving function of the receiving unit.

16. An illumination device comprising: an illumination instrument whose light source is an LED illumination lamp; and a controller that is separate from the illumination instrument, the controller including a receiving unit configured to receive information about an exchange time of the LED illumination lamp from the illumination instrument during an OFF period of the LED illumination lamp to avoid influence by the LED illumination lamp during an ON period thereof, wherein the controller further includes a control unit which turns the LED illumination lamp into the OFF state immediately before the receiving unit starts to receive the information about exchange time of the LED illumination lamp.

17. An illumination device comprising:

an illumination instrument whose light source is an LED illumination lamp; and a controller that is separate from the illumination instrument, the controller including a receiving unit configured to receive information about an exchange time of the LED illumination lamp from the illumination instrument during an OFF period of the LED illumination lamp to avoid influence by the LED illumination lamp during an ON period thereof, wherein the controller further includes a control unit that causes the LED illumination lamp, which otherwise is going to turn ON, to wait to switch to the ON state until the receiving unit completes reception of the information about exchange time of the LED illumination lamp.

* * * * *